United States Patent [19]

Lemaire et al.

[11] Patent Number: 4,909,959

[45] Date of Patent: Mar. 20, 1990

[54] CONDUCTIVE POLYMERS DERIVED FROM 3-ALKYLTHIOPHENES, A PROCESS FOR MANUFACTURING THEM AND ELECTROCONDUCTIVE DEVICES CONTAINING THEM

[75] Inventors: Marc Lemaire, Manterre; Jean Roncali, Les Lilas; Robert Garreau, Sarcelles; Francis Garnier, Champigny, all of France; Etienne Hannecart, Tervueren, Belgium

[73] Assignee: Solvay & Cie (société Anonyme), Brussels, Belgium

[21] Appl. No.: 32,637

[22] Filed: Apr. 1, 1987

[30] Foreign Application Priority Data

Apr. 1, 1986 [FR] France .................. 86 04744

[51] Int. Cl.$^4$ ............................................. H01B 1/06
[52] U.S. Cl. .................................. 252/500; 252/518; 252/512; 136/252; 136/263; 429/212; 526/256; 524/401; 524/405; 524/415; 524/438; 524/408; 524/164

[58] Field of Search ............... 204/59, 72, 78, 291; 252/500, 518, 512, 182.1; 429/194, 213, 212; 350/357; 528/380, 378, 379; 526/256; 524/401, 439, 405, 415, 438, 412, 423, 408, 164; 136/252, 263

[56] References Cited

U.S. PATENT DOCUMENTS

| | | | |
|---|---|---|---|
| 4,502,934 | 3/1985 | Gazard et al. | 350/357 |
| 4,543,306 | 9/1985 | Dubois et al. | 429/194 |
| 4,599,194 | 7/1986 | Frommer et al. | 252/500 |
| 4,737,557 | 4/1988 | Sato et al. | 526/256 |

*Primary Examiner*—Josephine Barr
*Attorney, Agent, or Firm*—Spencer & Frank

[57] ABSTRACT

The subject of the invention is mainly an electrically conductive polymer containing repeated units derived from 3-alkylthiophenes in which the alkyl substituent contains from six to nine carbon atoms.

The invention also relates to a process for manufacturing these polymers and to electroconductive devices containing them.

19 Claims, No Drawings

CONDUCTIVE POLYMERS DERIVED FROM 3-ALKYLTHIOPHENES, A PROCESS FOR MANUFACTURING THEM AND ELECTROCONDUCTIVE DEVICES CONTAINING THEM

The present invention relates to electrically conductive polymers derived from 3-alkylthiophenes in which the alkyl substituent contains from six to nine carbon atoms, and also to a process for manufacturing them.

It also relates to electroconductive devices containing these polymers.

Electrodes obtained by electrochemical polymerization, on a conductive support, of heterocyclic monomers possessing at least one 5-membered aromatic heterocyclic system containing a single hetero atom, and substituted with at least one group of the alkyl, alkoxyl, hydroxyl, aryl, substituted aryl, halogen, trihalomethyl, cyano, amino or dialkylamino type, have already been described. This monomer can be a derivative substituted at the 3-position, at the 4-position or at the 3- and 4-positions of pyrrole, of thiophene or of furan, or an indole substituted on the benzene ring with 1 to 4 groups (French Patent Application FR-A-2,527,843).

The electrochromic properties of polymers derived from these 5-membered heterocyclic systems, especially those derived from pyrrole, from thiophene, from 3-methyl-thiophene, from 3,4-dimethylthiophene and from 2,2'-dithiophene have also been described (F. Garnier et al., Journal of Electroanalytical Chemistry, 148, 1983, pages 299 to 303).

Some electrical applications, such as the production of devices (display screens, switches, memory elements, etc.) based on electrochromism (involving a modification of the properties of absorption or transmission of light, induced by a variation of the applied external voltage, possessed by the material used), of electrodes for rechargeable batteries, of photovaltaic cells, of electrochemical cells, and the like, require conductive polymers having special properties.

These special properties are, in particular, the most complete possible reversibility and the highest possible stability of the oxidation/reduction cycle between the oxidized and reduced forms of the polymer/ doping agent system. The shortest possible switching time between these two forms is also desirable.

The conductive polymers manufactured hitherto and mentioned above are not, from this standpoint, completely satisfactory.

The objective of the present invention is consequently to provide a new family of conductive polymers possessing, to a sufficient extent, the special properties mentioned above.

To this end, the invention relates to electrically conductive polymers containing repeated units derived from 3-alkylthiophenes in which the alkyl substituent contains from six to nine carbon atoms. These polymers are advantageously homopolymers consisting exclusively of repeated units derived from only one of these 3-alkyl-thiophenes.

The invention also relates to a process for manufacturing these polymers, according to which a 3-alkylthiophene in which the alkyl substituent contains from six to nine carbon atoms is electrochemically polymerized by anodic oxidation in a polar solvent and in the presence of a suitable electrolyte.

The alkyl substituent of the 3-alkylthiophenes which can be used as monomers for preparing the polymers of the invention contains from six to nine carbon atoms. It can be chosen from linear or branched $C_6$ to $C_9$ alkyl radicals. The preferred radical is the n-octyl radical.

The monomers which can be used for manufacturing the polymers according to the invention can be synthesized according to known methods, for example by a Grignard coupling reaction starting with 3-bromothiophene, for example, in the presence of a catalyst based on a nickel complex (see, in particular, G. Consiglio et al., Tetrahedron, 39, 1983, page 2699 and T. Hagashi et al., J. Amer. Chem. Soc., 104, 1982, page 180).

The preparation of the polymers according to the invention is performed by electrochemical polymerization, generally in an electrolysis cell, by anodic oxidation of the monomer in a polar solvent in the presence of suitable electrolytes, according to conventional techniques (see, for example, French Patent Application FR-A-2,527,843 and F. Garnier et al., op. cit.).

According to these techniques, the concentration of monomers is generally between $10^{-3}$ and $10^{-1}$ mole per liter of solvent.

As solvents, polar solvents possessing dissolving properties with respect to both the monomer and the chosen electrolyte, and which are stable in the range of potentials applied, are preferably used. Examples of solvents which can be used are acetonitrile, tetrahydrofuran, methylene chloride and nitrobenzene.

The electrolytes are generally chosen from conductive salts of formula $C^+A^-$, in which $C^+$ is cation and in which $A^-$ is an anion.

The cation $C^+$ is preferably chosen from alkali metal ions and ions $R_4N^+$ and $R_4P^+$ (R being an alkyl radical such as ethyl and butyl radicals, for example).

The anion $A^-$ is preferably chosen from $ClO_4^-$, $AsF_6^-$, $SbF_6^-$, $SO_4^{2-}$, $C_6H_5COO^-$, $C_6H_5SO_3^-$, $BF_4^-$, $PF_6^-$ and $CF_3SO_3^-$ ions.

Typical electrolytes are, for example, fluoroborates such as tetraethylammonium tetrafluoroborate, and perchlorates such as lithium perchlorate and tetrabutylammonium perchlorate.

The electrolyte concentration is generally between $10^{-3}$ and 1 mole per liter of solvent.

The electrochemical cell within which the polymerization of the monomers according to the invention may be performed can operate under constant-voltage or constant-current conditions.

In the first case, (constant-voltage control), the cell contains, in addition to the external current source, three electrodes including a reference electrode for controlling the potential.

During the electrolysis, a layer of polymer is deposited on the conductive element used as an anode in the electrolysis cell. This anode can be made of a noble metal such as gold or platinum, or another metal such as gold- or platinum-plated copper, or titanium or nickel, or a conductive glass (tin oxide, iridium/tin oxides). After the electrolysis, an electrode is hence obtained which consists, in fact, of a conductive body coated with a polymer film adhering to it, and which contains a certain proportion of the anion originating from the electrolyte. The polymer and the anion thereby form a charge transfer complex. The chemical composition of the polymer film can be represented by the empirical formula $(M^+A_y^-)$ where $M^+$ denotes the monomer, $A^-$ the anion or counter-ion, y the proportion of anion in the polymer expressed per unit of monomer (that is to say, the doping ratio) which, in the case of the polymers of the invention, can easily reach a value of 0.5, and n the degree of polymerization, which it is generally impossible to determine easily on account of the insoluble nature of the polymer.

Since the electrochemical polymerization of the monomer takes place on the anode of the electrolysis cell, it is not possible to obtain directly an electrode covered with a polymer doped with cations.

To obtain a cathode of this type, it is possible to use the anode obtained above and subject it to a double reduction. A first electrochemical reduction is possible immediately after the polymerization, leaving the anode in the electrolysis cell and causing the cell to discharge. This discharge causes the extraction of the anions which dope the polymer. A second reduction can then be performed, either chemically or electrochemically. The chemical method consists in immersing the polymer in a solution containing the desired cations. These cations will occupy the sites left vacant by the original anions. Thus, to obtain a polymer doped, for example, with $Li^+$, $Na^+$, or $K^+$ cations, it is possible to use, for example, a solution of naphthalenelithium, naphthalenesodium or naphthalenepotassium in tetrahydrofuran. The electrochemical method generally consists in placing the electrode as cathode in an electrolysis cell containing the desired cations in solution. These cations become inserted in the sites left vacant by the original anions when the solution is electrolyzed. The cations can be, for example, alkali metal ions such as those mentioned above, or complex ions such as $(Bu)_4N^+$ or $(Et)_4N^+$ derived from an electrolyte in solution in a solvent such as acetonitrile or tetrahydrofuran. The concentration of electrolyte in the solution is generally between $10^{-3}$ and 1 mole per liter of solvent.

The conductive polymers according to the invention possess properties of reversibility of the oxidation/reduction cycle between their oxidized and reduced forms, which properties are altogether exceptional and unexpected and are as follows, in particular:
- a ratio between the oxidation current and reduction current intensities close to unity;
- a switching time between their oxidized and reduced forms (speed of doping/dedoping) of the order of a few tens of milliseconds (ms), most frequently equal to or less than 50 ms;
- a stability of the oxidation/reduction cycle such that these polymers can undergo more than $1.5 \times 10^6$ cycles while still retaining 80% of the initial charge.

These exceptional properties of the conductive polymers according to the invention make them especially usable for producing electroconductive devices whose principle of operation is based on these properties and which also constitute a subject of the present invention.

By way of non-limiting examples of electroconductive devices containing conductive polymers derived from 3-alkylthiophenes according to the invention, the following may be mentioned:
- electrochemical devices for energy storage, such as accumulator batteries and rechargable or non-rechargable cells, in which the anodes consist of electrodes coated with films of the said polymers doped with anions; and
- electrochromic devices based on the modification of the optical spectrum of the said polymers according to their electrochemical state, which modification is exhibited during cycles of oxidation and reduction of the films of polymers deposited on the anodes of these devices during charging and discharging; by way of examples of electrochemical devices of this kind, there may be mentioned display screens, opto-electronic devices and optical memories and switches.

The invention is illustrated by the non-limiting examples which follow.

EXAMPLES 1 to 4

Examples 1, 2 and 4 are given by way of comparison.

By coupling 3-bromothiophene with the corresponding Grignard reagents, in diethyl ether at room temperature and in the presence of a catalytic complex based on nickel, the following four 3-alkylthiophenes are synthesized:

3-methylthiophene (starting with methylmagnesium bromide);

3-pentylthiophene (starting with pentylmagnesium bromide);

3-octylthiophene (starting with octylmagnesium bromide), and 3-decylthiophene (starting with decylmagnesium bromide).

These four 3-alkylthiophenes are electrochemically polymerized by anodic oxidation under constant-voltage conditions in a cell through which a current of 5 mA is passed and containing three electrodes. The anode is a glass plate on which a conductive film of platinum has been deposited. The cathode takes the form of a platinum wire. The anode potential is fixed at 1.4 V relative to the reference electrode. The electrolyte solution contains tetrabutylammonium perchlorate (0.02 M) and the alkylthiophene (0.2 M) dissolved in nitrobenzene. The polymerization is performed under an argon atmosphere for a sufficient time to deposit a polymer film of approximate thickness 1,000 Å.

The electrochemical properties of the polymers thereby obtained are measured from the cyclic voltameter trace recorded by means of a PAR model 173 potentiostat, and from the intensity peaks recorded, when a charge of 1 $mC/cm^2$ was applied under square-wave voltage pulses, on a Tektronix type 564B oscilloscope. They are collated in the table below.

In addition, the switching time of poly(3-octylthiophene) (Example 3) between the oxidized form (slightly blue-tinged) and the reduced form (red) is only 50 milliseconds.

These results show that the poly(3-alkylthiophenes) according to the invention, especially poly(3-octylthiophene), have electrochemical properties ($I_{Pa}/I_{Pc}$ ratio and reversibility of the oxidation/reduction cycle) which make them especially usable in electrochemical devices for energy storage and electrochromic devices.

TABLE

| Example No. | 1 (comparison) | 2 (comparison) | 3 (invention) | 4 (comparison) |
|---|---|---|---|---|
| Polymer synthesized | poly(3-methylδ)-thiophene) | poly(3-pentyl-thiophene) | poly(3-octyl-thiophene) | poly(3-decyl-thiophene) |

TABLE-continued

| Example No. | 1 (comparison) | 2 (comparison) | 3 (invention) | 4 (comparison) |
|---|---|---|---|---|
| Ratio $\frac{I_{Pa}}{I_{Pc}}$ between the oxidation current ($I_{Pa}$) and reduction current ($I_{Pc}$) intensities | 1.55 | 1.45 | 1.25 | 1.63 |
| Percentage of charges still exchanged after n cycles | 50% $n = 10^6$ | 45% $n = 10^6$ | 80% $n = 1.6 \times 10^6$ | 30% $n = 10^6$ |

We claim:

1. An electrically conductive insoluble polymer containing repeated units derived from 3-alkylthiophenes in which the alkyl substituent contains from six to nine carbon atoms and an effective amount of a dopant to produce reversible oxidized and reduced forms, having a stability such that said electrically conductive insoluble polymer can undergo more than $1.5 \times 10^6$ oxidation/reduction cycles while still retaining 80% of an initial charge.

2. The conductive insoluble polymer polymers according to claim 1, characterized in that they consist essentially of repeated units derived from a 3-alkylthiophene in which the alkyl substituent contains from six to nine carbon atoms.

3. The conductive insoluble polymer polymers according to claim 1, characterized in that the repeated units are derived from 3-n-octylthiophene.

4. Electroconductive devices selected from the group consisting of display screens, switches, and memory elements containing a polymer according to claim 1.

5. Electrochemical devices for energy storage, in which the anodes consist of electrodes coated with films of insoluble polymers according to claim 1 doped with anions.

6. Electrochromic devices in which the anodes are coated with films of insoluble polymers according to claim 1

7. A display screen containing a polymer according to claim 1.

8. A switch containing a polymer according to claim 1.

9. A memory element containing a polymer according to claim 1.

10. The electrochemical device according to claim 5, wherein said polymer film is represented by the formula $(M^+A^-_y)_n$ wherein $M^+$ denotes the monomer, $A^-$ denotes the anion, y is the proportion of polymer expressed per unit of monomer having a value up to about 0.5, and n is the degree of polymerization.

11. In the electrochemical device according to claim 10, wherein said anion is selected from the group consisting of $ClO_4^-$, $AsF_6^-$, $SbF_6^-$, $SO_4^{2-}$, $C_6H_5COO^-$, $C_6H_5SO_3^-$, $BF_4^-$, $PF_6^-$ and $CF_3SO_3^-$ ions.

12. The conductive insoluble polymer according to claim 1, doped with anions.

13. The conductive insoluble polymer according to claim 12 represented by the empirical formula $(M^+A^-_y)_n$ wherein $M^+$ denotes the monomer, $A^-$ denotes the anion, y is the proportion of polymer expressed per unit of monomer having a value up to about 0.5, and n is the degree of polymerization.

14. The conductive insoluble polymer according to claim 13, wherein said anion is selected from the group consisting of $ClO_4^-$, $AsF_6^-$, $SbF_6^-$, $SO_4^{2-}$, $C_6H_5COO^-$, $C_6H_5SO_3^-$, $BF_4^-$, $PF_6^-$ and $CF_3SO_3^-$ ions.

15. In a rechargeable battery, the improvement comprising electrodes of an electrically conductive insoluble polymer as set forth in claim 1.

16. In an electrochemical cell, the improvement comprising electrodes of an electrically conductive insoluble polymer as set forth in claim 1.

17. In a photovoltaic cell, the improvement comprising electrodes of an electrically conductive insoluble polymer as set forth in claim 1.

18. The conductive insoluble polymer according to claim 1, having a ratio between an oxidation current and a reduction current intensity of about one.

19. The conductive insoluble polymer according to claim 1, having a switching time between said oxidized form and said reduced form of less than about 50 milliseconds.

* * * * *